United States Patent
Vaghi

(10) Patent No.: US 6,571,223 B1
(45) Date of Patent: May 27, 2003

(54) SYSTEM AND METHOD GENERATING POSTAL/CARRIER RATES USING ENCODED INFORMATION

(75) Inventor: Nino R. Vaghi, Bethesda, MD (US)

(73) Assignee: Vaghi Family Intellectual Properties, LLC, McLean, VA (US)

(*) Notice: Subject to any disclaimer, the term of this patent is extended or adjusted under 35 U.S.C. 154(b) by 0 days.

(21) Appl. No.: 09/428,916

(22) Filed: Oct. 28, 1999

(51) Int. Cl.[7] ............................................. G06F 17/60
(52) U.S. Cl. .................. 705/401; 705/407; 705/408; 705/414
(58) Field of Search .................... 177/25.15; 705/400, 705/401, 407, 408, 414, 416

(56) References Cited

U.S. PATENT DOCUMENTS

| | | | | |
|---|---|---|---|---|
| 4,342,038 A | * | 7/1982 | Lemelson | 346/9 |
| 4,495,581 A | * | 1/1985 | Piccione | 705/402 |
| 4,511,793 A | * | 4/1985 | Racanelli | 705/404 |
| 4,814,995 A | | 3/1989 | Daniels, Jr. | 364/464.02 |
| 5,001,648 A | * | 3/1991 | Baker | 705/407 |
| 5,229,587 A | | 7/1993 | Kimura et al. | 235/432 |
| 5,448,641 A | * | 9/1995 | Pintsov et al. | 380/51 |
| 5,606,507 A | | 2/1997 | Kara | 364/464.18 |
| 5,917,925 A | * | 6/1999 | Moore | 382/101 |
| 5,925,872 A | | 7/1999 | Wyatt et al. | 235/472 |
| 5,932,860 A | | 8/1999 | Plesko | 235/454 |

FOREIGN PATENT DOCUMENTS

JP 63-19524 * 1/1988

OTHER PUBLICATIONS

Knill: "Counting scales"; Material Handling Engineering, Jun. 1994, vol. 49, No. 6, pp. 63–65.*

* cited by examiner

*Primary Examiner*—Edward R. Cosimano
(74) *Attorney, Agent, or Firm*—Fleshner & Kim, LLP

(57) ABSTRACT

A system and method for computing postal/carrier rates encodes a weight value for an item to be shipped or mailed in bar code form. The bar code is scanned, at a different location, to input the weight value into a program which computes a postal/carrier rate. A mark bearing the correct postage is then generated and affixed to the item. By encoding and scanning weight information in bar-code form, office efficiency is enhanced and costs are significantly reduced. Instead of bar codes, maxicodes and other coded marks may be used. Further, additional data may be encoded with the weight value for billing and accounting purposes. The invention is also especially well suited to computing postal/carrier rates for heavy and unusually sized items of mail.

23 Claims, 9 Drawing Sheets

SYSTEM AND METHOD GENERATING POSTAL/CARRIER RATES USING ENCODED INFORMATION

BACKGROUND OF THE INVENTION

1. Field of the Invention

This invention generally relates to generating information for sending items by mail or carrier, and more particularly to a system and method for determining postal and/or private carrier rates for letters, packages, parcels, and other mail items using a computer program.

2. Description of the Related Art

Computer programs have been developed for calculating postage and carrier rate information for letters, packages, and other items. These programs have proven desirable because they perform all the functions for preparing an item for mailing or shipping at a single location.

A computer program of this type is disclosed in U.S. Pat. No. 5,606,507 to Kara. The Kara system is a Windows-type program that automatically computes postage based on weight measurements taken by an electronic scale connected to a communications port of a computer. Once postage has been computed, the program instructs a peripheral device to print an envelope or label bearing a stamp of appropriate value.

For all of their advantages, computer-based systems of this type are not optimum for at least three reasons. First, these systems require a physical connection to exist between an electronic scale and the computer incorporating the program. This is undesirable, especially in an office setting, because it increases the amount of equipment each secretary is required to have at her workstation and consequently increases overhead costs.

Second, known systems essentially require a user, such as a secretary, to perform all the mailing and shipping operations herself. For example, secretaries who use conventional postage computing systems must not only type and print out letters to be mailed, they must also weigh the letters, compute the postage, print out postage-bearing stamps, affix the stamps to the letters, and then carry the letters to a mail room or other place of mailing. Conventional methods, therefore, cause secretaries to waste time performing monotonous, inefficient tasks which could be put to more productive use.

Third, known systems are unsuitable for heavy or unusually sized mail items. This is attributable mainly to their reliance on electronic scales that typically have a small weight (e.g,. five to ten pound) capacity. As a result, manual methods often have to be employed for determining postage for larger or unusually sized items.

A need therefore exists for a system and method that determines postal and private carrier rates faster and more efficiently than those conventionally employed, and which is also suitable for use with packages of all sizes and weights.

SUMMARY OF THE INVENTION

It is one object of the present invention to provide a system and method for computing postage and/or private carrier rates which is faster and more efficient than those conventionally employed.

It is another object of the present invention to achieve the aforementioned objective by computing postal/carrier rates in a manner that does not require a physical connection to exist between an electronic scale and a computer running a postage-computing program, thereby allowing a single electronic scale to satisfy the needs of a plurality of workstations and thus reducing the amount of equipment and overhead costs in an office.

It is another object of the present invention to provide a system and method for computing postal/carrier rates which reduces the number of time-inefficient tasks a user must perform, thereby increasing work productivity.

It is another object of the present invention to provide a system and method for computing postal/carrier rates which is suitable for use with heavy and/or unusually sized items, as well as for standard sized letters and light-weight packages.

The foregoing and other objects of the invention are achieved by providing a system for generating information for sending items by mail or private carrier, which system includes an electronic scale for weighing an item, a printer which prints encoded information on a sheet of material indicative of the weight of the item, a computer terminal running a program for computing postal/private carrier rates, and a scanner which scans the encoded information and then inputs data indicative of the weight of the item into the program. The electronic scale may be one capable of weighing items of a variety of weights and sizes, including small letters and packages (e.g., five pounds or less)all the way up to items in excess of seventy pounds or any other heavier weight. Further, the printer may be incorporated within a housing of the scale or within a stand-alone unit interfaced to a communications port of the scale. For convenience purposes, the sheet of material (e.g., paper, tape, plastic, etc.) may be adapted to stick to the item. Optionally, the printer may be one adapted to print the encoded information directly on the item by spraying ink or other conventional techniques.

The method of the present invention includes the steps of weighing an item on an electronic scale, printing encoded information on a sheet of material indicative of a weight of the item as determined by the electronic scale, providing a program at a computer terminal which computes postal/private carrier rates based on weight information, scanning the encoded information to input information indicative of the weight of the item into the program, and computing a postal/carrier rate based on the weight information derived from the encoded information using the program. In the system and method described herein, the encoded information may be in the form of a bar code, maxicode, holographic code, or any other code or mark, conventionally known or otherwise, in which information may be encrypted.

In optional embodiments, the encoded information printed and scanned by the invention may include information in addition to weight information. The additional information may be entered into the scale or stand-alone printer by a user, for example, via a scale or printer keyboard or other input device, and may include one or more of customer account data, department data, method of mailing/shipping data, employee identification data, and company identification data. When this data is scanned along with the weight information, the rate computed by the mailing/shipping program at the computer terminal may be automatically associated with that customer for billing and accounting purposes.

According to other aspects of the invention, certain features of the mailing/shipping program may be automatically activated based on the data scanned. For example, if method of mailing/shipping data is encoded indicating that an item is to be sent by private courier (e.g., FEDERAL EXPRESS), the FEDERAL EXPRESS page of the program may automatically be displayed for the employee's convenience. Additionally, various fields of this page may automatically be filled based on the scanned data, thereby further expediting the mailing/shipping process.

The system and method are particularly well suited for use in businesses which have high-volume mailing and shipping demands, as the bar coding of weight information advantageously enables an assembly-line-like process to be established which streamlines efficiency and office productivity.

DESCRIPTION OF THE PREFERRED EMBODIMENTS

Figure 1:
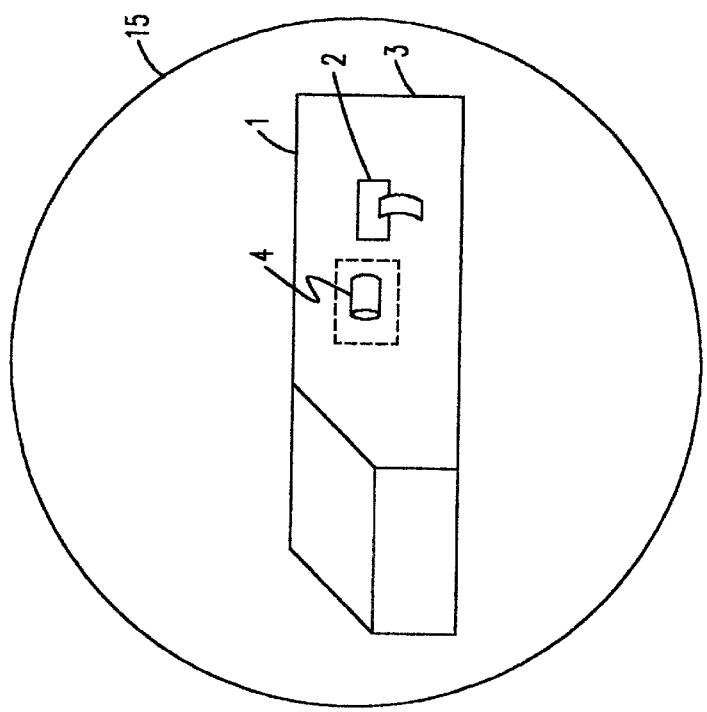
FIG. 1 is a diagram of a first embodiment of the system of the present invention configured with a printer incorporated within a housing of an electronic scale.
Figure 1:
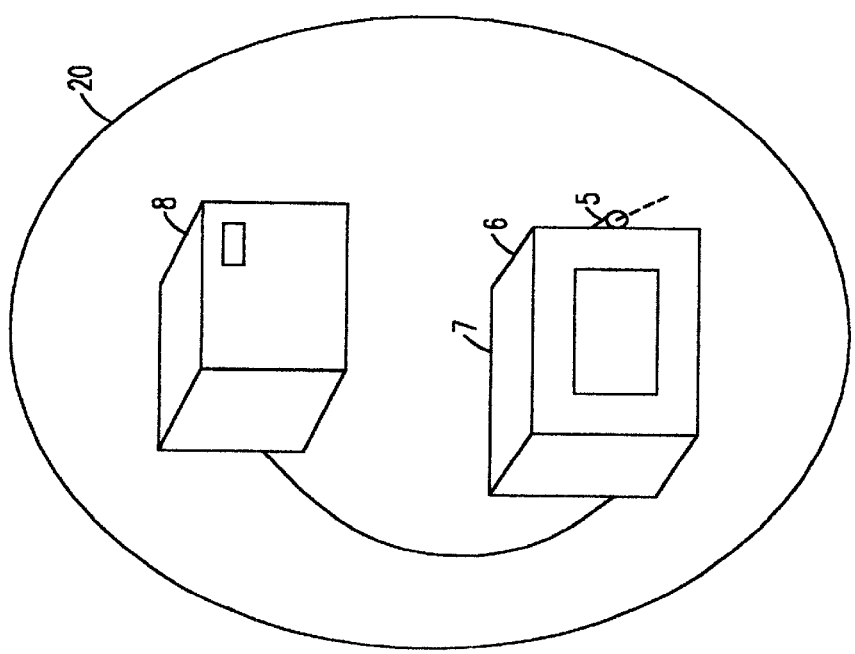

Referring to FIG. 1, a first embodiment of system of the present invention includes an electronic scale 1 and a printer 2. The electronic scale may be or operate in accordance with any type of conventionally known electronic scale for weighing items of a variety of weights and sizes, except that the scale is adapted to communicate weight signals to printer 2 either directly or through a communications port, described in greater detail below. Scale 1, for example, may be a programmable type such as disclosed in U.S. Pat. No. 4,814,995 for weighing letters and packages generally in the five to ten pound range. Optionally, the scale may be one designed to weigh larger sized items in excess of five pounds, including those which may weigh seventy pounds or more.

Printer 2 may also be any type conventionally known that is capable of printing encoded information. For example, printer 2 may be one that prints bar codes, maxicodes, holographic codes or any other encrypted mark or code. A bar code printer of this type is disclosed, for example, in U.S. Pat. No. 5,229,587. Optionally, printer 2 may be one adapted to print encoded information directly on an item by spraying ink or other conventional techniques.

In the context of the invention, printer 2 is appropriately interfaced and adapted to accept weight information from control circuits of the scale. In accordance with the first embodiment of the system, printer 2 is advantageously sized to fit within a housing 3 of the scale, along with a supply of sheet material 4 onto which a bar code bearing weight information is printed. The sheet material may be made of paper, tape, plastic, or any other surface which can accept and hold a printed code. Preferably, electronic scale 1 and printer 2 are located at a first area 15 of, for example, an office, home, or other place where mailing and shipping operations are to be transacted.

As shown in FIG. 1, located at a second area 20 is a scanner 5 interfaced to a communications port of a computer terminal 6.

Figure 2:
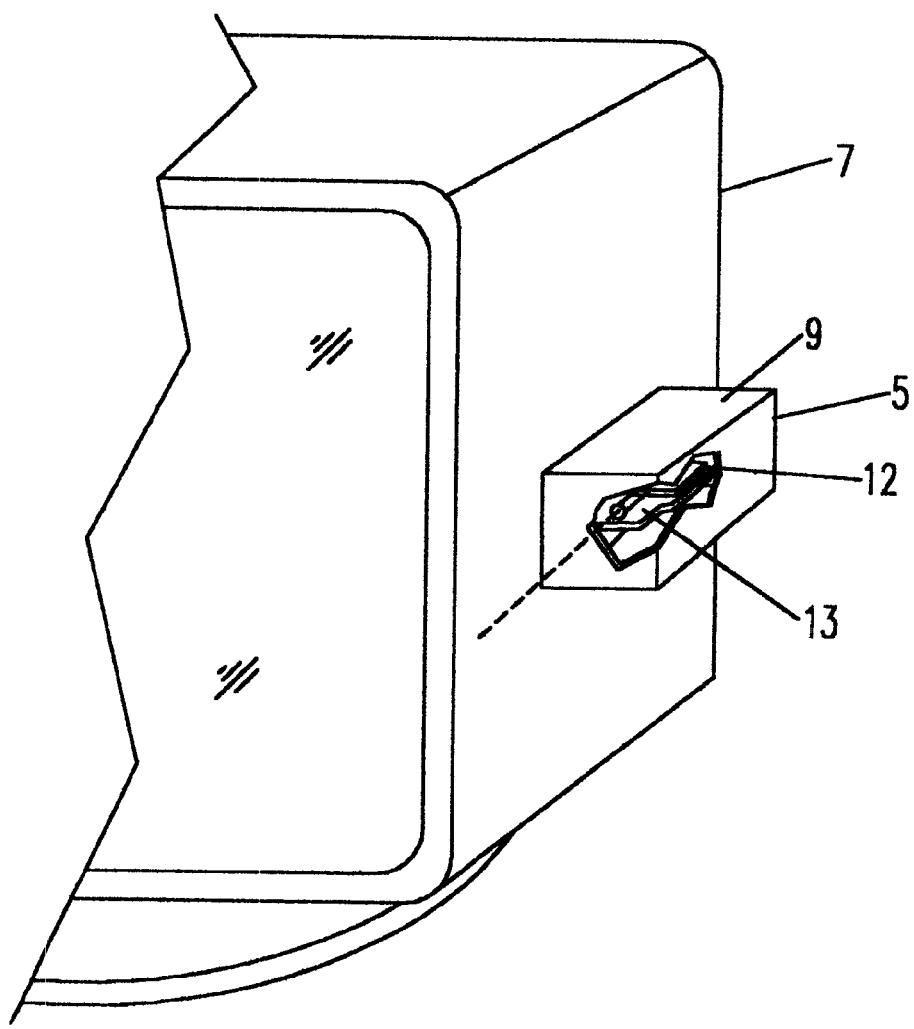
FIG. 2 is one type of scanner which may be used in accordance with the first embodiment of the system of the present invention.

Scanner 5 may be any type conventionally known for reading information encoded by printer 2. Preferably, scanner 5 is adapted to be removably mounted in a convenient location that will not clutter the desk or work area of a user. FIGS. 1 and 2 show scanner 5 having a housing 9 mounted onto a side of a computer monitor 7 and configured to include an interior mounted electronics board 12 connected to an optical scanning element 13. Those skilled in the art can appreciate, however, that the scanner of the present invention may be located or attached to any other piece of equipment (e.g., a keyboard, CPU housing, etc), or even may be placed on a user's desk if space is not a concern. Further, for ease of use, the scanner may be a hand-held type such as disclosed in U.S. Pat. Nos. 5,925,872 and 5,932,860.

Computer terminal 6 includes a CPU loaded with an application program that computes postal and/or private carrier rates based on weight information and other data (e.g., destination, zip-code, class of mail, etc.) input by a user through, for example, one or more interactive screens. Computer programs of this type are disclosed, for example, in U.S. Pat. Nos. 6,249,778 and 6,047,273 as well as in U.S. Pat. No. 5,606,507, however those skilled in the art may appreciate that this program may be any other known type, provided it is adapted to accept encoded weight information in accordance with the present invention.

Computer terminal 6 is preferably connected to a printer 8 which prints a postal or carrier rate mark of a value of design determined by the application program. If the item weighed by scale 1 is letter size, printer 8 may, for example, be a laser, dot-matrix, ink jet or other type printer (e.g., thermal) which prints the mark on an envelope in which the letter is to be sent. For heavier or unusually sized items, printer 8 may print the mark on, for example, an adhesive label that will be attached to the item by the user, however those skilled in the art can appreciate that the mark may be placed on any other writing surface.

Figure 3:
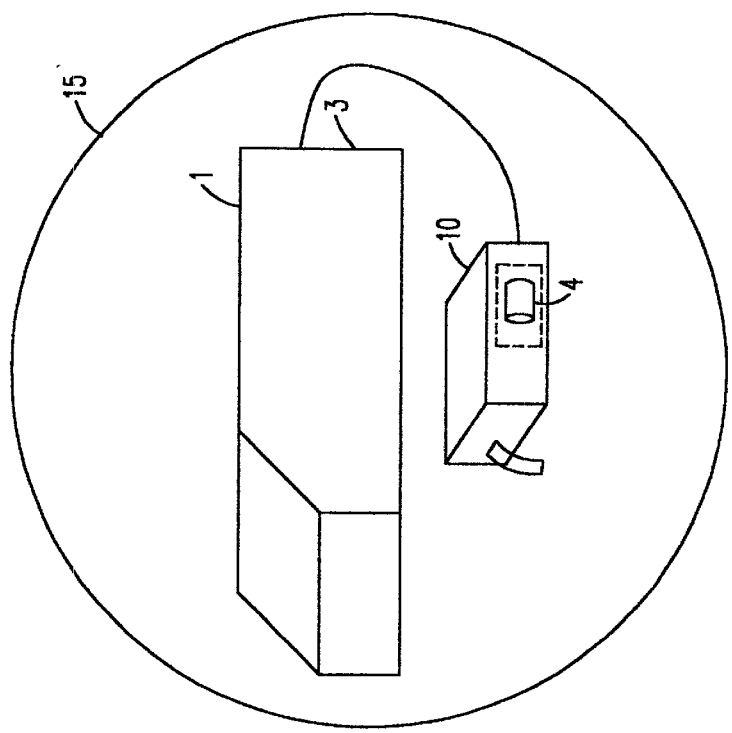
FIG. 3 is a diagram of a second embodiment of the system of the present invention configured with a stand-alone printer.
Figure 3:
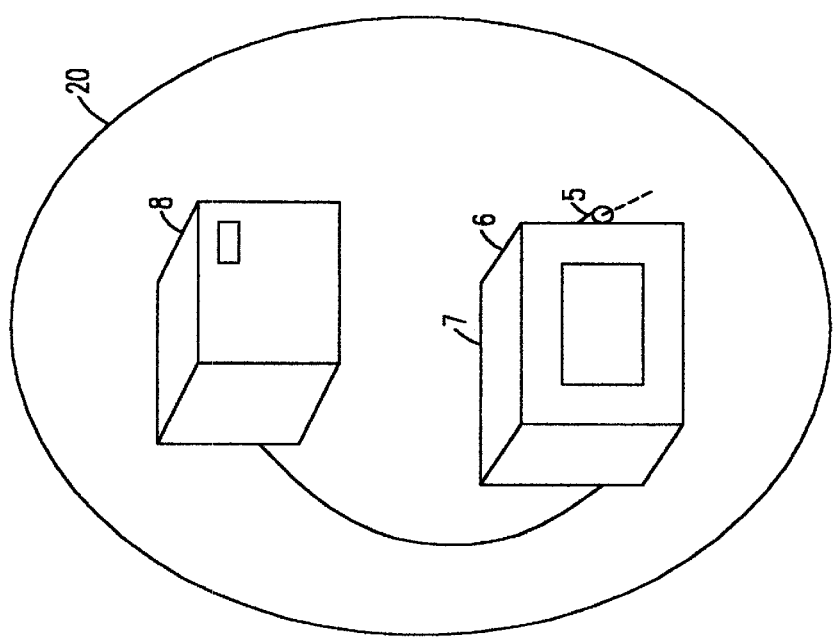

Referring to FIG. 3, a second embodiment of the system of the present invention is the same as the first embodiment except that the printer is a stand-alone unit 10 interfaced to a communications port of electronic scale 1. This embodiment is especially advantageous in that it may be adapted to a user's existing scale, thus saving the user replacement costs. As with the first embodiment, printer 10 may be any type conventionally known.

Figure 4:
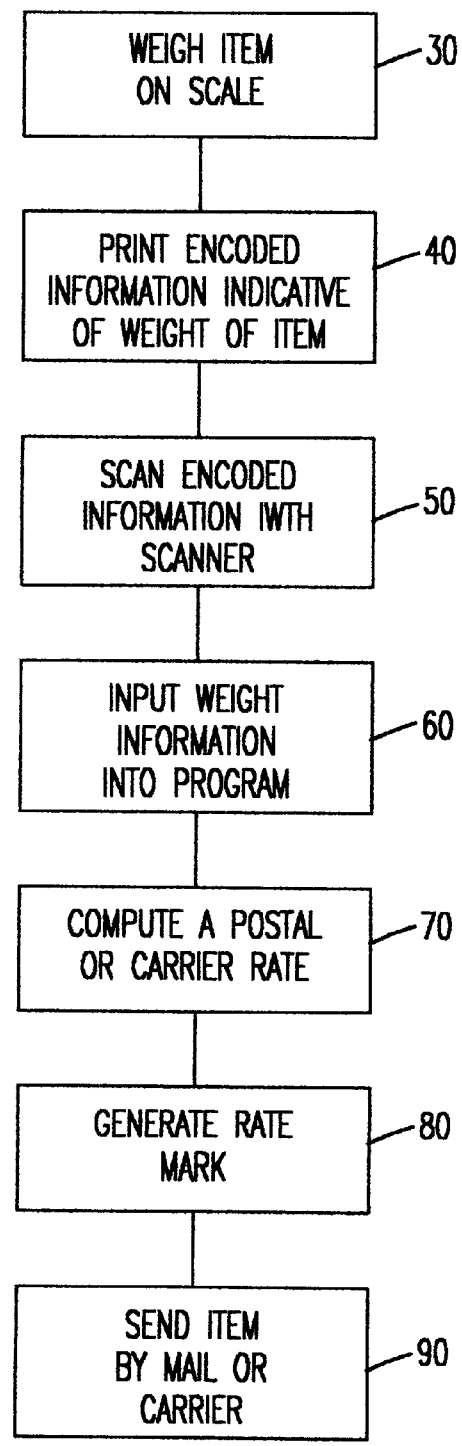
FIG. 4 is a flow diagram showing steps included in a first embodiment of the method of the present invention.

FIG. 4 is a flow diagram showing the steps of a first embodiment of the method of the present invention, as implemented in accordance with either of the systems shown in FIGS. 1 and 3. As shown in FIG. 4, the method begins by having a user weigh an item to be mailed or shipped on an electronic scale. (Block 30). The printer, either incorporated within or interfaced to the scale, prints encoded information indicative of the weight of the item on a sheet of material. (Block 40). If the sheet of material has an adhesive back or other means of attachment, a user sticks the sheet of material bearing the encoded information onto the item. The item is then carried to the area where the computer terminal is located. Optionally, the user may simply carry or forward the encoded sheet to the computer terminal area.

Once in the computer terminal area, the coded sheet is scanned by the scanner. (Block 50). If the sheet is attached to the item to be shipped or mailed and/or the item is large or awkwardly sized, a hand-held scanner is preferably used. Once scanned, the encoded weight information is input into the postal/carrier rate computing program through a communications port of the computer terminal. (Block 60). The program then computes a postal or carrier rate for the item based on the weight information input from the scanner and/or other parameters (e.g., class of mail, designation, zip-code, overnight delivery, etc.) designated by the user. (Block 70).

Subsequent steps of the method include generating a stamp or other mark bearing the postal or carrier rate computed by the program either on an envelope or a label to be affixed to the item. (Block 80). The item is then sent to its intended destination. (Block 90).

Figure 5:
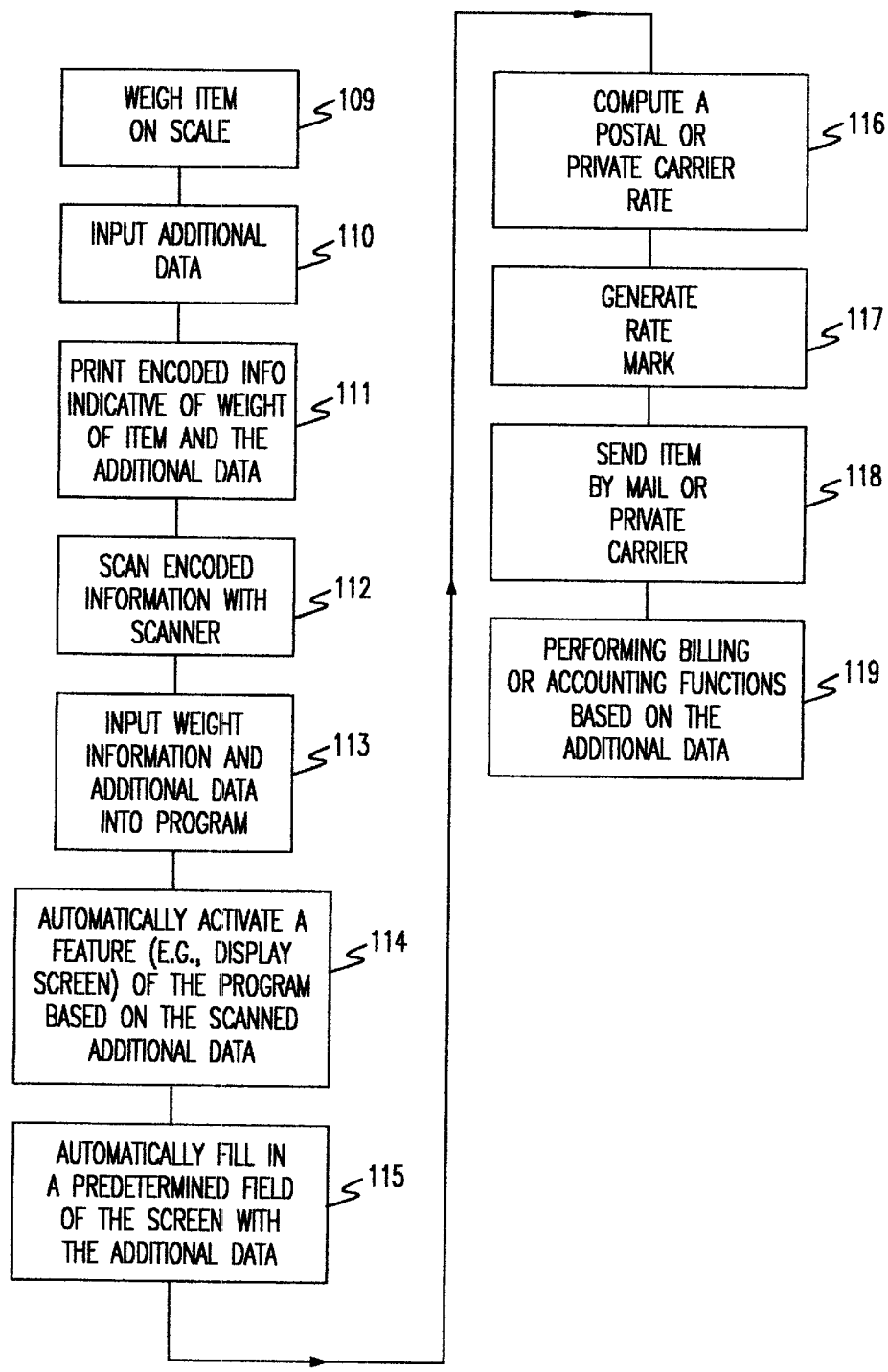
FIG. 5 is a flow diagram of steps included in a second embodiment of the method of the present invention.

FIG. 5 is a flow diagram showing the steps of a second embodiment of the method of the present invention. The second embodiment is similar to the first embodiment except that the encoded information printed and scanned by the invention may include data in addition to weight information. This additional data may be entered into the scale or stand-alone printer by a user, for example, via a scale or printer keyboard or other input device (see, e.g., FIG. 7), and may include one or more of the following:

1. Customer account data. The customer account data may include information (e.g., one or more alphanumeric characters) assigned to a customer for identification purposes. When the account data is scanned along with the weight value, the rate computed by the program at the computer terminal may then be automatically associated with that customer for billing and accounting purposes.

2. Department data. The department data may include information identifying a specific department or section of a business. By encoding department data along with weight information, the program at the computer terminal may then track which departments were responsible for mailing/shipping which items.

3. Method of Mailing/Shipping data. Encoding method of mailing/shipping data with the weight information is an especially advantageous aspect of the invention. This data may, for example, include information indicating the class of mail if the item is to be sent through the U.S. mail, the type of private courier if to be sent in this manner, designation and source address information, account balances, or any other information required or associated with the mailing or shipping of an item.

Preferably, this data corresponds to one of the features or fields of the mailing/shipping program running at the computer terminal. When this encoded information is then scanned, the mailing/shipping data may automatically be input into the program to assist in the rate computation and/or for accounting purposes or other internal use. As a result, an employee at the computer terminal is saved from having to manually input this data him or herself. Encoding mailing/shipping data along with weight information, therefore, advantageously simplifies and expedites the overall postage computation process.

4. Employee Identification data. Employee identification data may be information identifying the employee (e.g., clerk or secretary) who performed one or more steps of the mailing/shipping method for any given item. This information may be useful for accounting and managerial functions, as well as for other purposes.

5. Company Identification data. Company identification data may be information identifying a particular company when, for example, the mailing/shipping program is shared or used by a plurality of companies. When scanned, this data may then be used to indicate what company the cost of shipping or mailing an item is to be charged back to.

The method of FIG. 5 begins by having a user weigh an item to be mailed or shipped on an electronic scale. (Block 109). The user then inputs additional data as previously described into the printer using an input device either on the scale or printer. (Block 110). The printer then prints encoded information indicative of the weight of the item and the additional data on a sheet of material. (Block 111). If the sheet of material has an adhesive back or other means of attachment, a user sticks the sheet of material bearing the encoded information onto the item. The item is then carried to the area where the computer terminal is located. Optionally, the user may simply carry or forward the encoded sheet to the computer terminal area.

Once in the computer terminal area, the encoded information on the sheet is scanned by the scanner. (Block 112). If the sheet is attached to the item to be shipped or mailed and/or the item is large or awkwardly sized, a hand-held scanner is preferably used. Once scanned, the encoded weight information and additional data are input into the postal/carrier rate computing program through a communications port of the computer terminal. (Block 113). The program then automatically activates one or more of its features based on the scanned additional data. (Block 114). This feature may include calling a dedicated screen corresponding to a private carrier identified in the code. For example, if method of mailing/shipping data is encoded indicating that an item is to be sent by private courier (e.g., FEDERAL EXPRESS), the FEDERAL EXPRESS page of the program may automatically be displayed for the employee's convenience. Optionally, or additionally, one or more fields of this screen may then be filled in with the data, to expedite the rate computation process. (Block 115).

The program computes a postal or carrier rate for the item based on the weight information input from the scanner and/or other parameters (e.g., class of mail, designation, zip-code, overnight delivery, etc.) designated by the user. (Block 116).

Subsequent steps of the method include generating a stamp or other mark bearing the postal or carrier rate computed by the program either on an envelope or a label to be affixed to the item. (Block 117). The item is then sent to its intended destination. (Block 118). Optionally, billing and/or accounting functions may be performed based on the additional data. (Block 119).

If desired, the order of the steps shown in FIG. 5 may be altered in various ways. For example, one or more of the activating steps and filling in steps of Blocks 114 and 115 may be performed after the computing step of Block 116. Additionally, the step of inputting additional data in Block 110 may be performed before the weighing step in Block 109. Additionally, one or more of Blocks 110, 114, 115, and 119 may altogether be eliminated.

Figure 6:
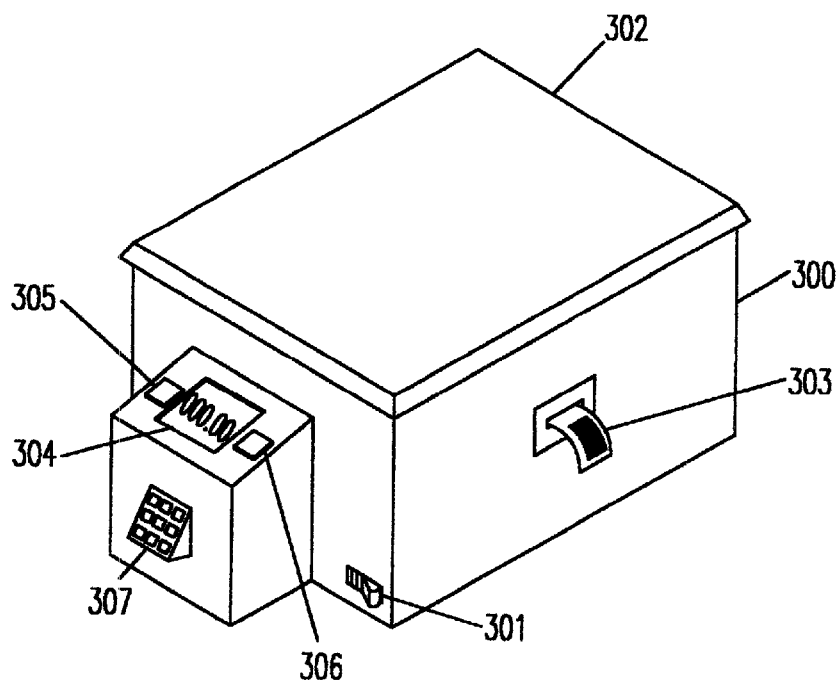
FIG. 6 is a diagram showing an electronic scale in accordance with an optional embodiment of the present invention.

FIG. 6 is a diagram showing an electronic scale 300 in accordance with the optional embodiment of the invention. The scale includes an on/off switch 301, a weighing surface 302, a printer 303 for printing encoded information described herein, and a display 304 including several function keys for operating the scale and printer. The function keys include a zero key 305 for resetting the scale and a key 306 for instructing the printer to print a coded mark containing a weight value and/or the additional data. Optionally, the control program of the scale or printer may be written so that the encoded or additional information is printed automatically after a weight value is obtained. As a further option, functions keys may include a keypad 307 for allowing a user to enter the additional data described herein.

Figure 7:
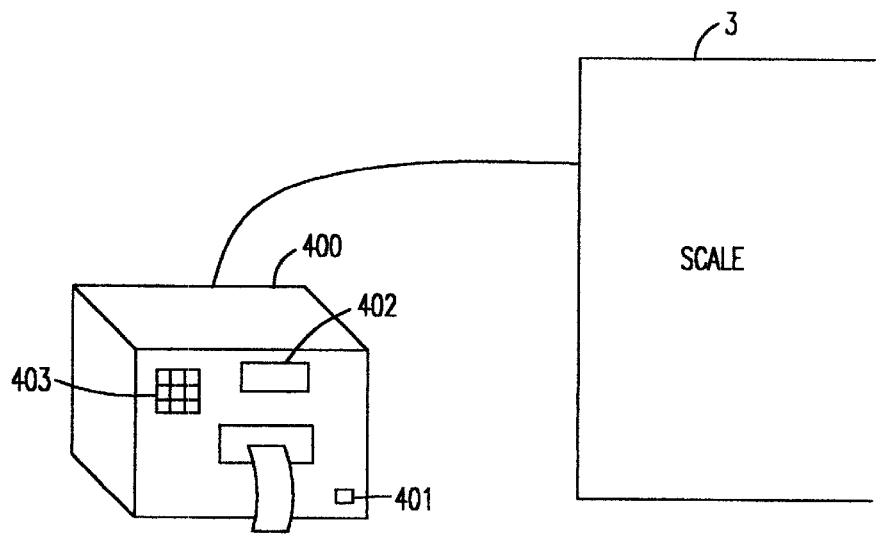
FIG. 7 is a diagram showing a printer in accordance with an optional embodiment of the present invention.

FIG. 7 is a diagram showing a printer 400 in accordance with the optional embodiment of the invention. The printer includes an on/off switch 401, a display 402, and an input device 403 (e.g., a keyboard) for allowing a user to enter the additional data for printing in encoded form along with weight data from the scale.

Figure 8:
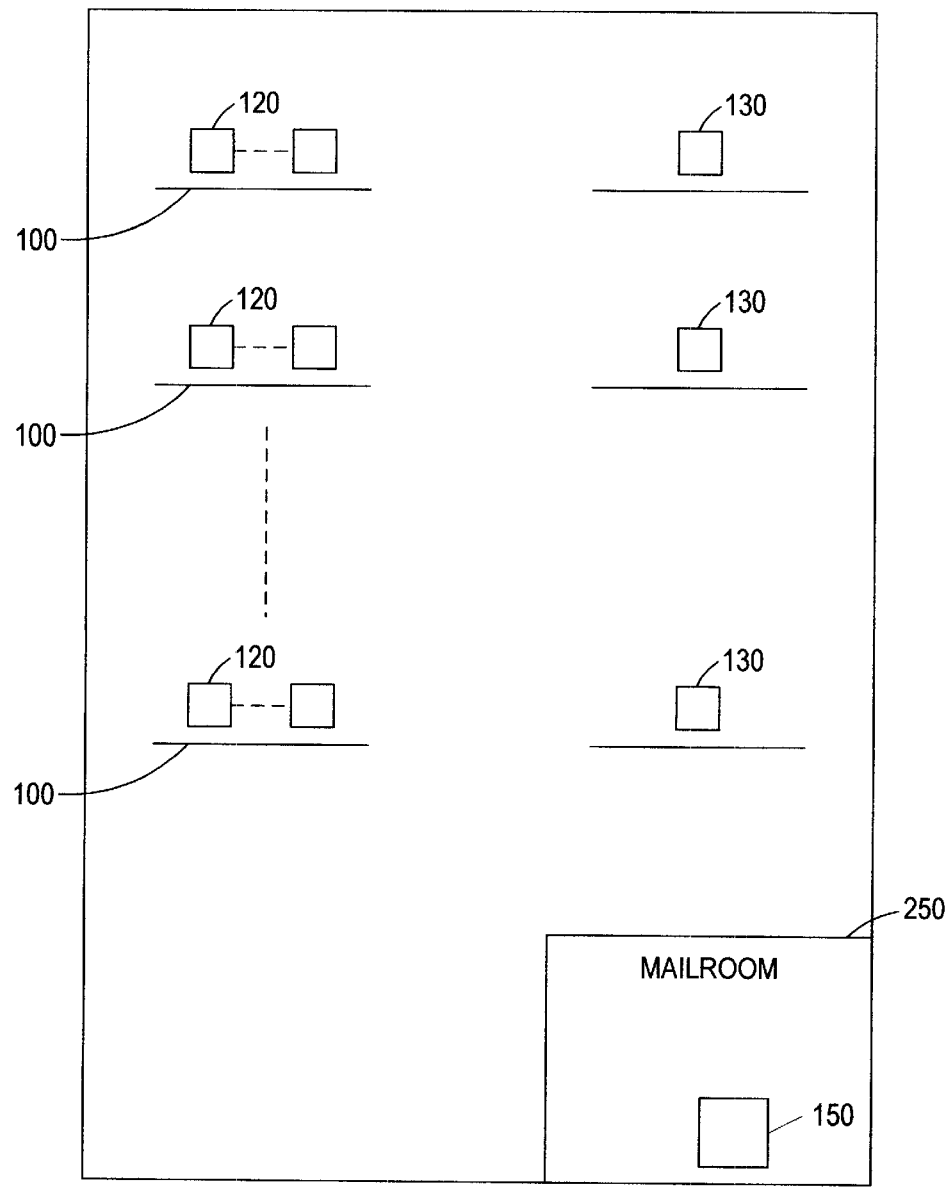
FIG. 8 is a conceptual diagram showing one illustrative application of the system and method of the present invention.
Figure 9:
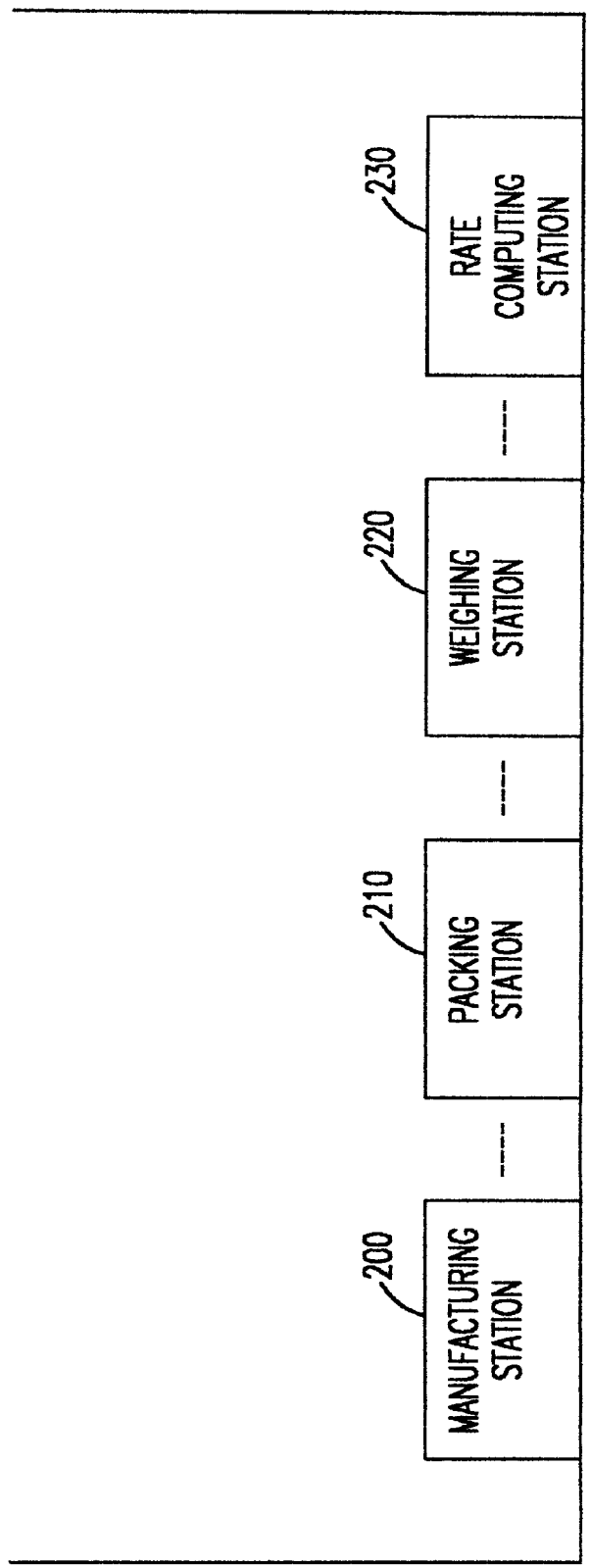
FIG. 9 is a conceptual diagram of another illustrative application of the system and method of the present invention.

FIGS. 8 and 9 show two conceptual applications of the method of the present invention used to improve the efficiency of the mailing and shipping operations of a business. In a conventional business setting, secretaries must not only type and print out letters to be mailed (or box the merchandise to be sold), they must also weigh the items, compute the postage, and then affix a postage-bearing label to the item or print out an envelope containing a rate mark. The items must then be taken to a designated area in the office for shipping or mailing. This antiquated procedure has proven time inefficient, undermining office productivity especially for businesses which ship and mail packages, parcels, and letters at high volume on a daily basis.

The present invention streamlines the mailing and shipping operations in an office and thus represents a substantial improvement over the conventional procedure discussed above. Referring to FIG. 8, a first illustrative application of the method of the present invention is implemented in an office building having multiple floors and a mail room 250. On each floor are located a plurality of secretarial stations 120 and one or more electronic scales and printers 130 in accordance with the present invention. The mail room 250 is equipped with at least one computer terminal and scanner 150 in accordance with the present invention.

With this arrangement, the method of the present invention advantageously allows assembly-line-type processing of mailing and shipping operations to be performed. Specifically, once the letters, parcels, or packages have been prepared by office secretaries, they need only weigh these items on the scale and weight-encoded labels will automatically be generated. These encoded labels may then be affixed to the items and the items placed in a bin or otherwise carried to the mail room. In the mail room, an employee scans the encoded labels and attaches a second label bearing postal or carrier rate information on the items for shipping or mailing. The method of the present invention, thus, relieves secretaries from having to perform the monotonous tasks of computing and affixing postage, thereby giving them more time to handle important matters which increases the productivity of the entire office.

Referring to FIG. 9, a second illustrative application of the method of the present invention is implemented in a factory setting having four stations, a manufacturing station 200 where product is manufactured, a packing station 210 where the product is boxed for shipment, a weighing station 220, and a postal/carrier rate computing station 230. The weighing station includes an electronic scale for weighing heavy and/or unusually sized packages and a printer in accordance with the present invention. The postal/carrier rate computing station 230 is equipped with a scanner and at least one computer terminal running a postage/carrier rate program.

With this arrangement, the method of the present invention allows the factory to perform assembly-line-type mailing and shipping operations. For example, after product has been manufactured and packaged, it is weighed at station 220 and an encoded label indicative of its weight is attached. The product is then conveyed to station 230 where a technician scans the encoded label and affixes a proper postage/carrier rate mark generated from the computer program. The present method, thus, advantageously improves efficiency and productivity of the factory.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

What is claimed is:

1. A method for generating information for sending items by mail or private carrier, comprising:

weighing an item on an electronic scale;

printing encoded information on a sheet of material, said encoded information including information indicative of a weight of said item as determined by said electronic scale;

providing a program at a remote computer terminal which computes postal/private carrier rates based on weight information;

scanning said encoded information to input the weight of said item into the program; and computing a postal/private carrier rate based on the weight of said item input in said scanning step using said program.

2. The method of claim 1, further comprising:

placing a mark indicative of the postal/carrier rate computed in said computing step on said item; and sending said item by mail or private carrier.

3. The method of claim 1, wherein said sheet of material is adapted for attachment to said item, said scanning step including scanning said encoded information from said sheet of material as attached to said item.

4. The method of claim 1, wherein said encoded information is encoded using at least one of bar codes, maxicodes, and holographic codes.

5. The method of claim 1, wherein said encoded information further includes at least one of customer account data, department data, method of mailing/shipping data, employee identification data, and company identification data.

6. The method of claim 5, further comprising:

entering said at least one of customer account data, department data, method of mailing/shipping data, employee identification data, and company identification data into one of said electronic scale and said printer, said entering step being performed by a user operating an input device of said electronic scale and said printer.

7. The method of claim 5, further comprising:

associating said postal/private carrier rate computed using said program with said at least one of customer account data, department data, method of mailing/shipping data, employee identification data, and company identification data for performing one or more billing or accounting functions.

8. The method of claim 5, wherein when at least one of said data is scanned into the program, a predetermined field of the program is automatically filled in with said data.

9. The method of claim 5, wherein when at least one of said data is scanned into the program, a corresponding feature of the program is automatically activated.

10. The method of claim 9, wherein said corresponding feature includes a display of a screen of the program corresponding to said at least one of said data.

11. A system for generating information for sending items by mail or private carrier, comprising:

an electronic scale which weighs an item;

a printer which prints encoded information on a sheet of material, said encoded information indicative of a weight of said item as determined by said electronic scale;

a computer terminal, remotely located from the electronic scale, which runs a program for computing postal/private carrier rates based on weight information; and a scanner which scans said encoded information on said sheet of material and inputs information indicative of the weight of said item into the program at said computer terminal, said program computing a postal/private carrier rate based on said information indicative of the weight of said item.

12. The system of claim 11, wherein said printer is incorporated within a housing of said electronic scale.

13. The system of claim 11, wherein said printer is incorporated within a stand-alone unit interfaced to a communications port of said electronic scale.

14. The system of claim 11, wherein said sheet of material is adapted for attachment to said item.

15. The system of claim 11, further comprising:

a printer interfaced to said computer terminal, said program instructing said printer to print a mark indicative of the postal/private carrier rate computed based on said information indicative of the weight of said item.

16. The system of claim 11, wherein said encoded information is encoded by said printer using at least one of bar codes, maxicodes, and holographic codes.

17. The system of claim 11, wherein said printer is incorporated within a stand-alone unit interfaced to a communications port of said electronic scale, and includes an input device for allowing a user to enter said at least one of customer account data, department data, method of mailing/shipping data, employee identification data, and company identification data to be printed by said printer.

18. The system of claim 11, wherein said encoded information further includes at least one of customer account data, department data, method of mailing/shipping data, employee identification data, and company identification data.

19. The system of claim 18, wherein said scale includes an input device for allowing a user to enter said at least one of customer account data, department data, method of mailing/shipping data, employee identification data, and company identification data to be printed by said printer.

20. The system of claim 18, wherein the program associates said postal/private carrier rate computed using said program with said at least one of customer account data, department data, method of mailing/shipping data, employee identification data, and company identification data for performing one or more billing or accounting functions.

21. The method of claim 18, wherein when at least one of said data is scanned into the program, a predetermined field of the program is automatically filled in with said data.

22. The system of claim 18, wherein when said scanner scans at least one of said data into the program, the program automatically activates a corresponding feature of the program.

23. The system of claim 22, wherein said corresponding feature of the program includes display of a screen of the program corresponding to said at least one of said data.

* * * * *